(12) United States Patent
Yeh et al.

(10) Patent No.: US 7,552,454 B2
(45) Date of Patent: Jun. 23, 2009

(54) OPTICAL PICKUP MODULE

(75) Inventors: Shih-Lin Yeh, Hsinchu (TW); Shih-Ming Hsu, Miaoli (TW)

(73) Assignee: Lite-On It Corporation, Taipei (TW)

( * ) Notice: Subject to any disclaimer, the term of this patent is extended or adjusted under 35 U.S.C. 154(b) by 854 days.

(21) Appl. No.: 11/154,374

(22) Filed: Jun. 15, 2005

(65) Prior Publication Data
US 2006/0190955 A1 Aug. 24, 2006

(30) Foreign Application Priority Data
Feb. 22, 2005 (TW) .............................. 94105190 A

(51) Int. Cl.
G11B 7/08 (2006.01)
G11B 5/40 (2006.01)
G11B 33/08 (2006.01)
G11B 33/14 (2006.01)

(52) U.S. Cl. ...................... 720/675; 720/679
(58) Field of Classification Search ................ 720/679, 720/675, 674, 676
See application file for complete search history.

(56) References Cited

U.S. PATENT DOCUMENTS 5,982,735 A * 11/1999 Tsai ............................ 720/675
6,636,473 B1 * 10/2003 Kagaya et al. ............... 720/683
2006/0190953 A1 * 8/2006 Nakashima et al. ......... 720/676

* cited by examiner

*Primary Examiner*—Julie Anne Watko
(74) *Attorney, Agent, or Firm*—J.C. Patents

(57) ABSTRACT

An optical pickup module reading data along a track-seeking path is provided. The optical pickup module comprises a base, a first fastening component, a first shaft and an optical pickup head. The base has a fastening plate and the fastening plate has a sliding hole, wherein an included angle is formed between the extension direction of the sliding hole and the track-seeking path. Since the included angle is formed between the extension direction of the sliding hole and the track-seeking path, one end of the first shaft can be easily inserted into the sliding hole of the fastening plate along the extension direction of the sliding hole. Then, another end of the first shaft is assembled with the first fastening component so that the first shaft is parallel to the track-seeking path. At the same time, one end of the first shaft tightly fits to the fastening plate.

19 Claims, 14 Drawing Sheets

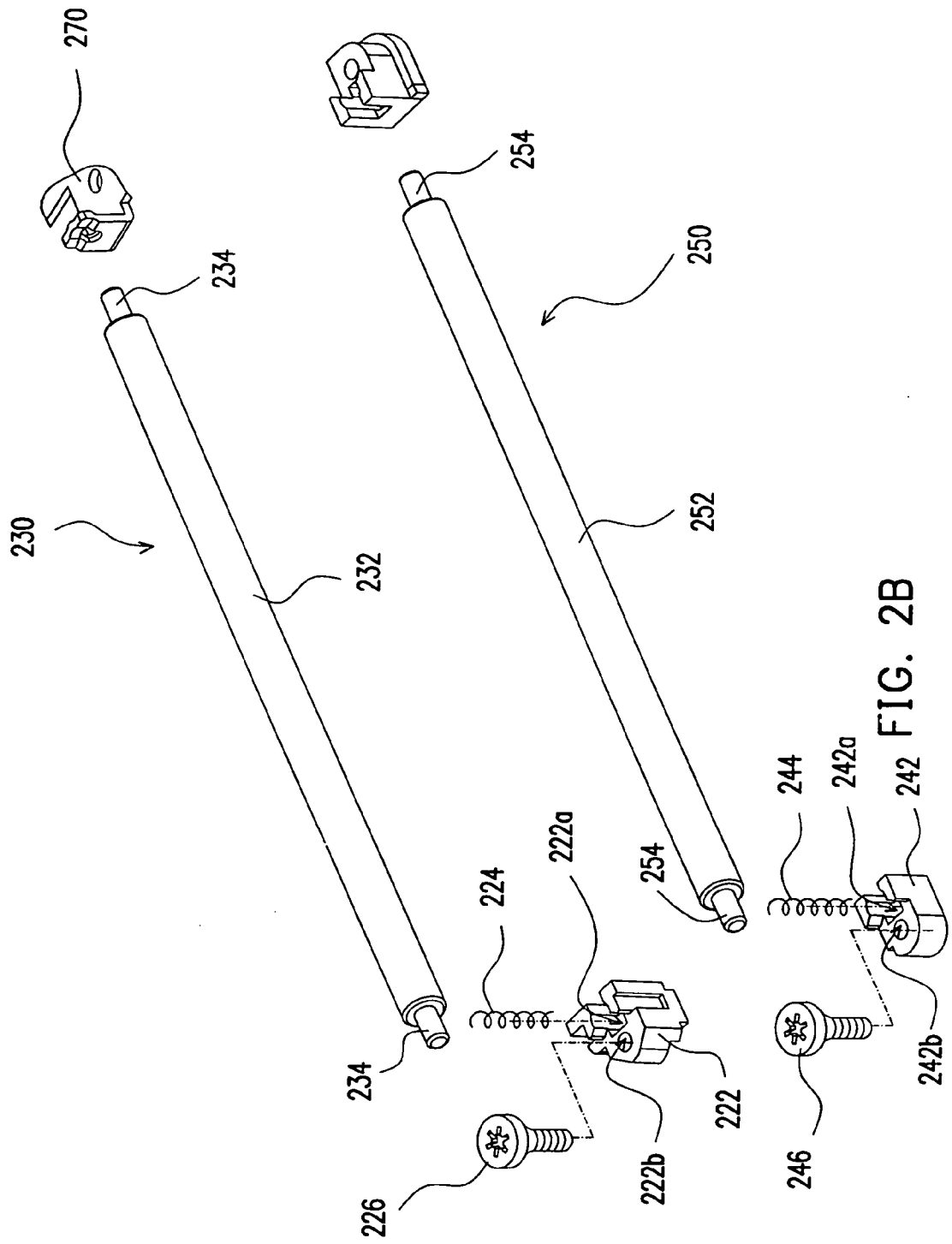

OPTICAL PICKUP MODULE

CROSS-REFERENCE TO RELATED APPLICATION

This application claims the priority benefit of Taiwan application Ser. No. 94105190, filed on Feb. 22, 2005. All disclosure of the Taiwan application is incorporated herein by reference.

BACKGROUND OF THE INVENTION

1. Field of the Invention

The present invention relates to an optical pickup module, and more particularly, to an optical pickup module which can be easily assembled and eliminate noise.

2. Description of the Related Art

A disc has various advantages such as great storage capacities, easy maintenance, long lasting preservation, low cost and durability. Accordingly, discs have gradually replaced traditional magnetic storage media, and become one of indispensable optical storage media. Generally speaking, a CD-ROM player or other type CD player is used to read (or reproduce) data stored in a disc. Regardless which type of CD player is used, an optical pickup head moves back and forth along a track-seeking path to read the data stored in the disc. However, the movement of the optical pickup head easily generates noise which makes the user uncomfortable while the data is reproducing.

FIG. 1A is a drawing showing an assembly of the traditional optical pickup module. FIG. 1B is a drawing showing the connection of the first shaft and the fastening plate according to the traditional technology. FIG. 1C is a vertical sectional view showing the traditional first shaft and the fastening plate after assembled. Referring to FIGS. 1A-1C, the traditional optical pickup module 100 comprises a base 110, a first fastening component 120, a first shaft 130, two second fastening components 140, a second shaft 150 and an optical pickup head 160. The optical pickup head 160 reads data stored in a disc (not shown) along the track-seeking path F. The base 110 further comprises a fastening plate 170, and the fastening plate 170 comprises a through hole 172 shown in FIG. 1C.

In addition, the first fastening component 120 and these two second fastening components 140 are disposed on the base 110. One end of the first shaft 130 is inserted in the through hole 172. Another end of the first shaft 130 connects with the first fastening component 120. Two ends of the second shaft 150 are assembled to the base 110 through the two second fastening components 140. Particularly note that the first shaft 130 and the second shaft 150 are assembled to parallel with the track-seeking path F. In addition, the optical pickup head 160 is movably disposed on the first shaft 130 and the second shaft 150 so as to move back and forth along the track-seeking path F.

The traditional fastening plate 170 is disposed on a reference plane R. A normal vector N of the reference plane R is parallel to the track-seeking path F. In order to smoothly assemble one end of the first shaft 130 into the through hole 172 of the fastening plate 170, the inner diameter D2 of the through hole 172 of the fastening plate 170 is slightly larger than the outer diameter D1 of the first shaft 130. Specifically, the inner diameter D2 of the through hole 172 must be at least larger than the outer diameter D1 of one end of the first shaft 130 so that the end of the shaft 130 can be inserted into the through hole 172 at a tilt angle shown in FIG. 1B. Since the inner diameter D2 of the though hole 172 is larger than the outer diameter D1 of the first shaft 130, a gap exists between the first shaft 130 and the through hole 172 of the fastening plate 170 after the first shaft 130 is assembled in the through hole 172. As a result, while the optical pickup head 160 of the optical pickup module 100 moves back and forth along the first shaft 130 and the second shaft 150, the vibration of the first shaft 130 results in noise.

SUMMARY OF THE INVENTION

Accordingly, the present invention is directed to an optical pickup module to eliminate noise resulting from the moving of the optical pickup head along the first shaft and the second shaft. Moreover, the first shaft can more tightly fit to the fastening plate.

In addition, the present invention is also directed to an optical pickup module which can simply and conveniently assemble the first shaft and the second shaft.

As embodied and broadly described herein, the present invention provides an optical pickup module for reading data stored in a disc along a track-seeking path. The optical pickup module comprises a base; a first fastening component, a first shaft, and an optical pickup head. The base comprises a fastening plate and the fastening plate has a sliding opening or a sliding recess. The extension direction of the sliding opening or the sliding recess and the track-seeking path form an included angle. In addition, the first fastening component is disposed over the base. One end of the first shaft is inserted into the sliding opening or the recess and the other end of the first shaft is connected with the first fastening component. The first shaft is parallel to the track-seeking path. Finally, the optical pickup head is movably disposed on the first shaft so that the optical pickup head can move back and forth along the track-seeking path.

In a preferred embodiment of the present invention, the optical pickup module further comprises two second fastening components and a second shaft. Two ends of the second shaft connect with the second fastening components, and the second shaft is parallel to the track-seeking path.

According to the optical pickup module of a preferred embodiment of the present invention, an inner diameter of the sliding opening or the sliding recess is larger than an outer diameter of the end of the first shaft, which is inserted into the sliding opening or the sliding recess. Additionally, when the first shaft is parallel to the track-seeking path, the first shaft is wedged in the sliding opening or the sliding recess.

According to the optical pickup module of a preferred embodiment of the present invention, the base can be, for example, a sheet metal part.

According to the optical pickup module of a preferred embodiment of the present invention, the fastening plate is disposed on a reference plane. A normal vector of the reference plane is parallel to the track-seeking path. And the extension direction of the sliding opening or the sliding recess and the normal vector form an included angle.

According to the optical pickup module of a preferred embodiment of the present invention, the fastening plate is disposed on a reference plane. A normal vector of the reference plane and the track-seeking path form the included angle. And the extension direction of the sliding opening or the recess is parallel to the normal vector.

According to the optical pickup module of a preferred embodiment of the present invention, the first fastening component comprises a first fastening socket, a first elastic component and a first lock component. The first fastening socket comprises a first shaft slot and a first lock hole and the first shaft is disposed in the first shaft slot. In addition, the first elastic component is disposed in the first shaft slot to support the first shaft. The first lock component is disposed in the first lock hole to fasten the first shaft in the fist shaft slot.

According to the optical pickup module of a preferred embodiment of the present invention, each of the second fastening components comprises a second fastening socket, a second elastic component and a second lock component. The second fastening socket comprises a second shaft slot and a second lock hole, wherein the second shaft is disposed in the second shaft slot. The second elastic component is disposed in the second shaft slot to support the second shaft. The second lock component is disposed in the second lock hole to fasten the second shaft in the second shaft slot.

According to the optical pickup module of a preferred embodiment of the present invention, the first shaft comprises a first rod and two first fastening parts. The two first fastening parts connect with two ends of the first rod, wherein the first fastening parts are fastened to the fastening plate and the first fastening component.

According to the optical pickup module of a preferred embodiment of the present invention, the second shaft comprises a second rod and two second fastening parts. The two second fastening parts connect with two ends of the second rod, wherein the second fastening parts are fastened by the second fastening components.

According to the optical pickup module of a preferred embodiment of the present invention, the fastening plate further comprises a support opening. The support opening partially overlaps the sliding opening and the extension direction of the support opening is parallel to the track-seeking path.

Accordingly, in the optical pickup module of the present invention, the extension direction of the sliding opening of the fastening plate and the track-seeking path form an included angle. An end of the first shaft, therefore, can be easily inserted into the sliding opening or the recess of the fastening plate along the extension direction. After the assembly, the end of the first shaft tightly fits to the fastening plate. Accordingly, the optical pickup head of the optical pickup module can move back and forth along the first shaft and the second shaft without generating noise.

The above and other features of the present invention will be better understood from the following detailed description of the preferred embodiments of the invention that is provided in communication with the accompanying drawings.

BRIEF DESCRIPTION OF THE DRAWINGS

FIG. 2B is a schematic drawing showing assemblies of the first shaft (the second shaft) and the first fastening component (the second fastening component) of the first embodiment of the present invention.

FIG. 6A' is a schematic drawing showing another fastening plate according to the fourth embodiment of the present invention.

DESCRIPTION OF SOME EMBODIMENTS

First Embodiment

Figure 1A:
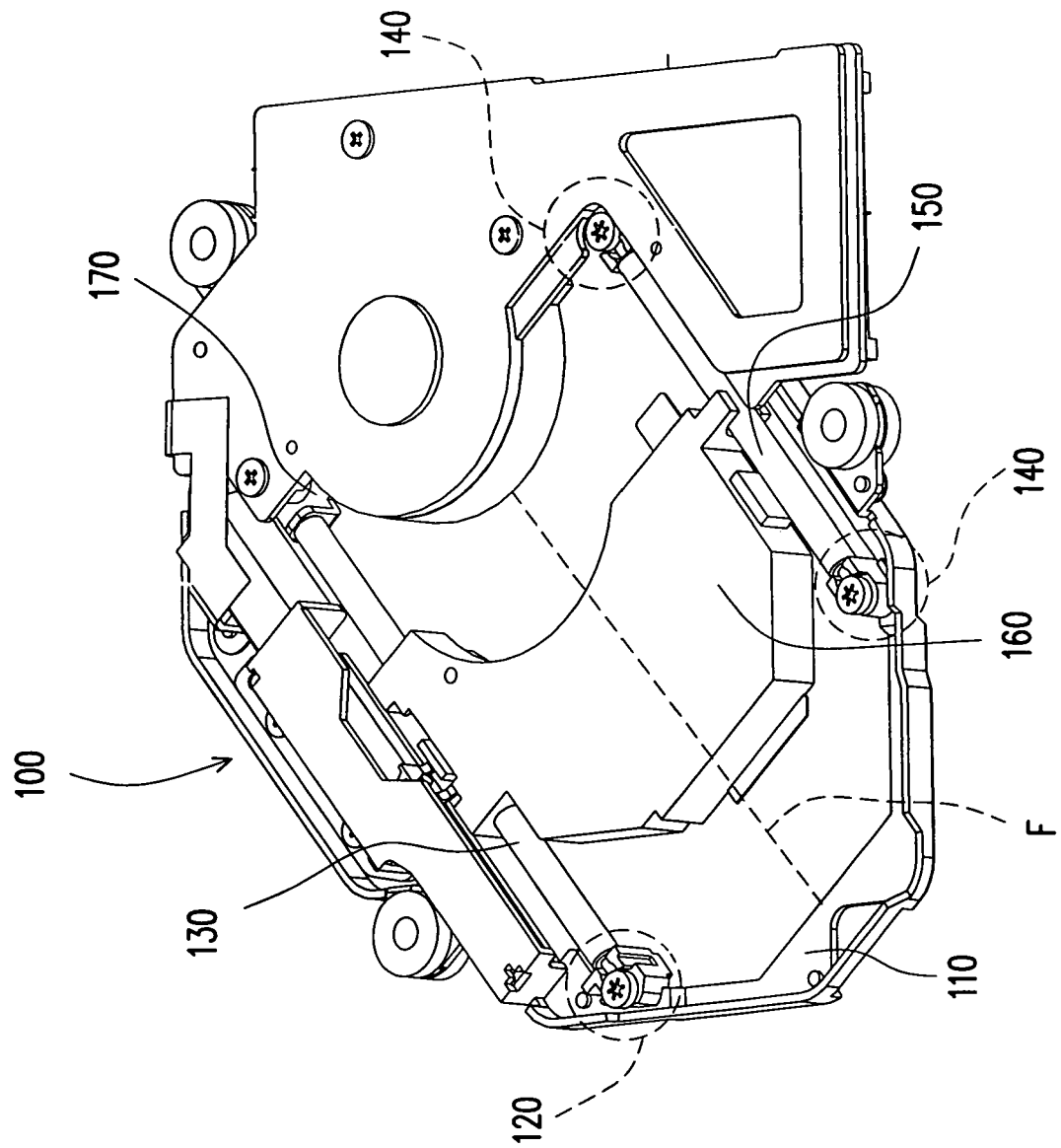
FIG. 1A is a drawing showing an assembly of the traditional optical pickup module.
Figure 1B:
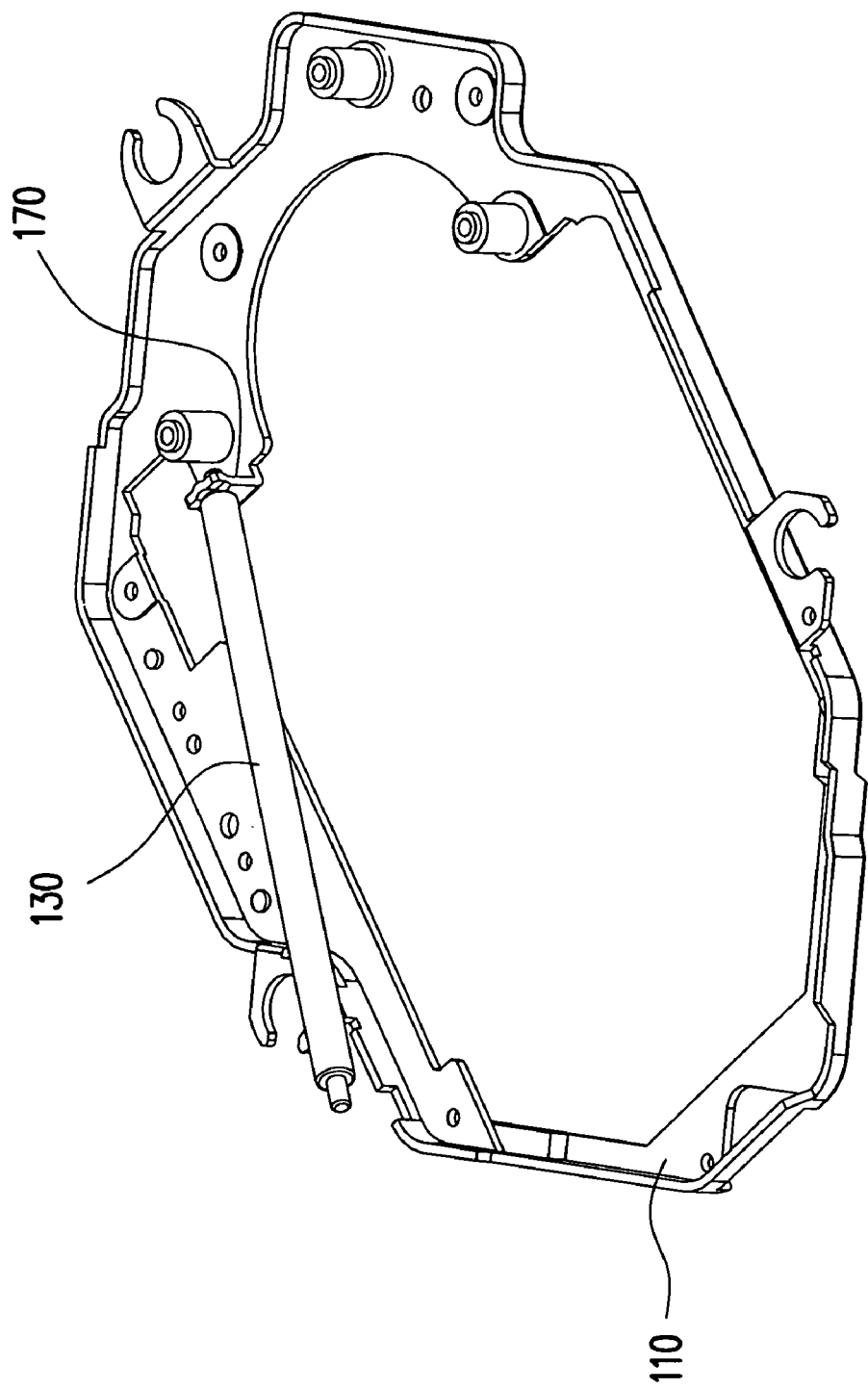
FIG. 1B is a drawing showing the connection of the first shaft and the fastening plate according to the traditional technology.
Figure 1C:
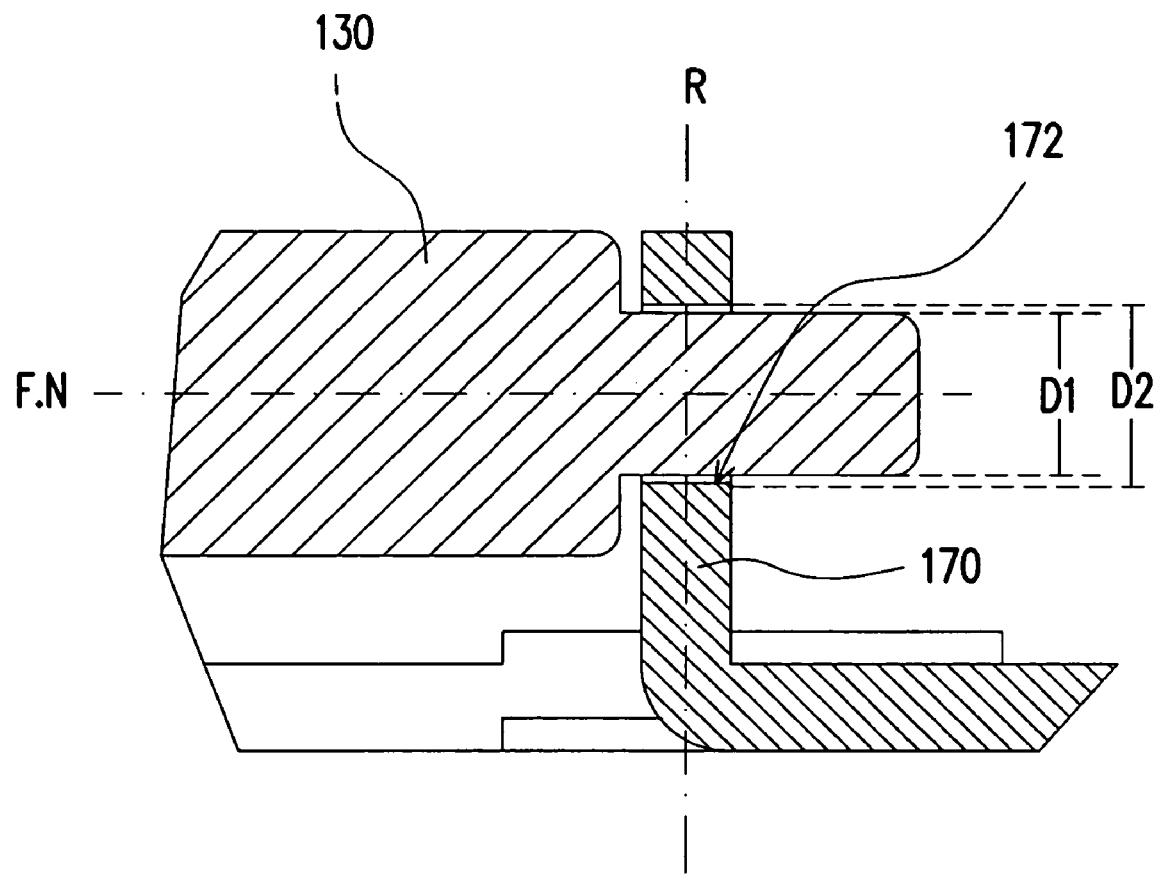
FIG. 1C is a vertical sectional view showing the traditional first shaft and the fastening plate after assembled.
Figure 2A:
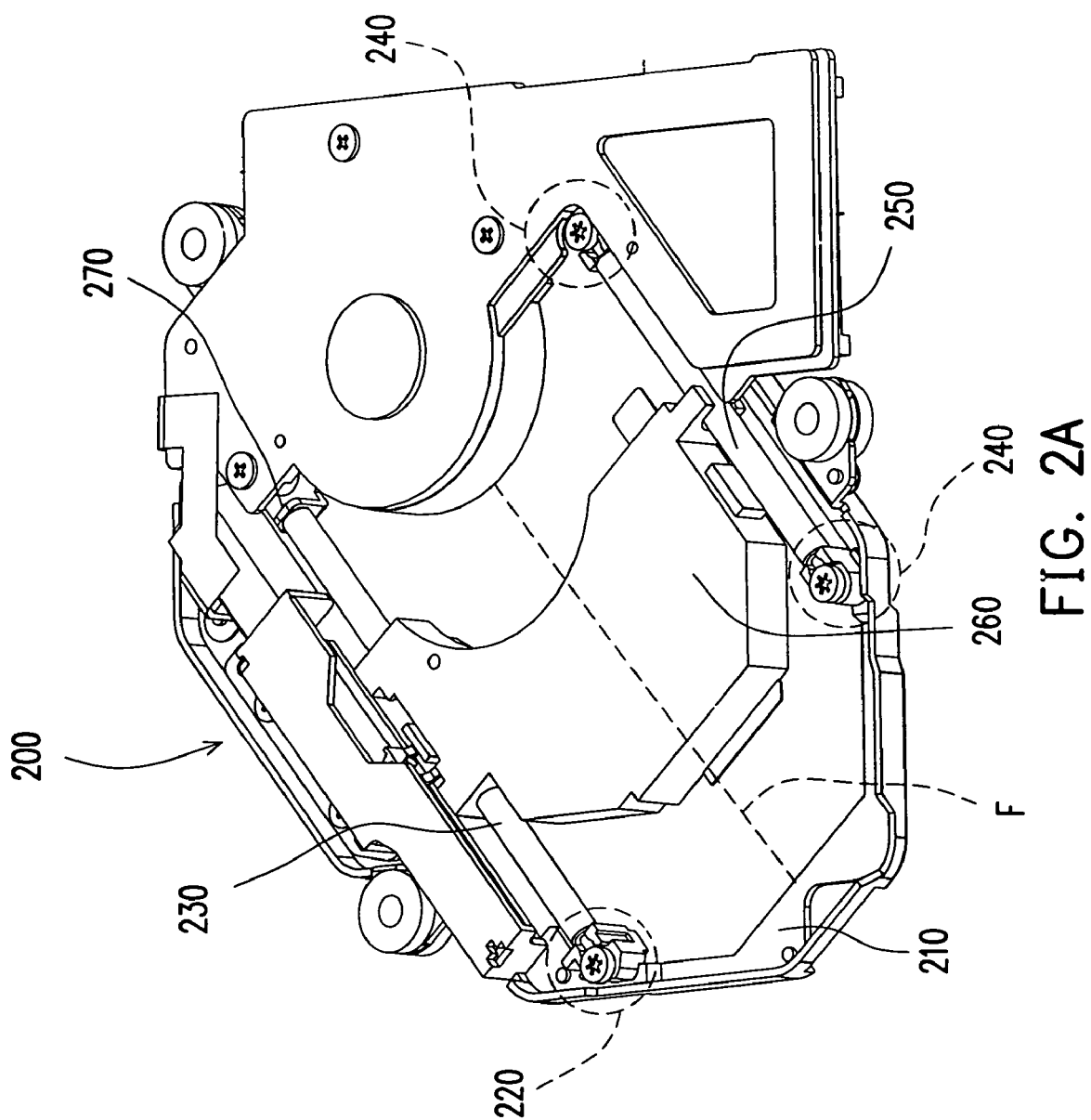
FIG. 2A is a schematic drawing showing an assembly of an optical pickup module according to the first embodiment of the present invention.

FIG. 2A is a schematic drawing showing an assembly of an optical pickup module according to the first embodiment of the present invention. Referring to FIG. 2A, the optical pickup module 200 comprises a base 210, a first fastening component 220, a first shaft 230 and an optical pickup head 260. The optical pickup head 260 of this embodiment reads data stored in a disc (not shown) along a track-seeking path F. The base 210 can be, for example, a sheet metal part. The base 210 comprises a fastening plate 270. The first fastening component 220 is disposed over the base 210. In addition, one end of the first shaft 230 is fastened through the fastening plate 270. Another end of the first shaft 230 connects with the first fastening component 220. The first shaft 230 is parallel to the track-seeking path. In this embodiment, the optical pickup head 260 is movably disposed on the first shaft 230 so that the optical pickup head 260 moves back and forth along the track-seeking path F.

In addition, the optical pickup module 200 of this embodiment further comprises two second fastening components 240 and a second shaft 250 so that the optical pickup module 200 stably reads the data of the disc along the track-seeking path F. From FIG. 2A, two ends of the second shaft connect with the corresponding second fastening components 240, for example.

FIG. 2B is a schematic drawing showing assemblies of the first shaft (the second shaft) and the first fastening component (the second fastening component) of the first embodiment of the present invention. Referring to FIGS. 2A and 2B, the first fastening component 220 comprises, for example, a first fastening socket 222, a first elastic component 224, and a first lock component 226. The first fastening socket 222 comprises, for example, a first shaft slot 222a and a first lock hole 222b. Additionally, one end of the first shaft 230 is disposed in the first shaft slot 222a.

The first elastic component 224 is disposed in the first shaft slot 222a and the first elastic component 224 supports one end of the first shaft 230. In addition, the first lock component 226 is disposed in the first lock hole 222b to fasten one end of the first shaft 230 in the first shaft slot 222a. In this embodiment, the first lock component 226 and the first elastic component 224 adjust the position of the first shaft 230 in the first fastening component 220. In detail, by locking the first lock component 226 in the first lock hole 222b to adjust the connection of the first shaft 230 over the base 210, the optimized location of the optical pickup head 260 to read the data can be maintained.

In this embodiment, the first shaft 230 comprises, for example, a first rod 232 and two first fastening parts 234 which connect with two ends of the first rod 232. In other words, the first fastening parts 234 are fastened to the fastening plate 270 and the first fastening component 220 respectively.

Referring to FIG. 2B, the structure of the second fastening component 240 is similar to that of the first fastening component 220. In this embodiment, each of the second fastening components 240 comprises, for example, a second fastening socket 242, a second elastic component 244 and a second lock component 246. The second fastening socket 240 comprises, for example, a second shaft slot 242a and a second lock hole 242b. In this embodiment, two ends of the second shaft 250 are disposed in the second fastening socket 242 and the second shaft slot 242a respectively.

The second elastic component 244 is disposed in the second shaft slot 242a, and the two elastic components 244 support two ends of the second shaft 250 respectively. In addition, the second lock component 246 is disposed in the second lock hole 242b to fasten two ends of the second shaft 250 in the second shaft slots 242a respectively. In this embodiment, the second lock component 246 and the second elastic component 244 adjust the position of the two ends of the second shaft 250 in the second fastening components 240. In detail, by locking the second lock component 246 in the second lock hole 242b to adjust the connection of the second shaft 250 over the base 210, the optimized location of the optical pickup head 260 to read the data can be maintained.

In this embodiment, the second shaft 250 comprises, for example, a second rod 252 and two second fastening parts 254 which connect with two ends of the second shaft 252. Moreover, the second fastening parts 254 are fastened to the second fastening components 240 respectively.

The description of the detailed structures of the base 210, the first fastening component 220, the first shaft 230, the second fastening component 240, and the second shaft 250 is exemplary. The present invention, however, is not limited thereto. One of ordinary skill in the art will know how to modify and change the structure. Following is detailed description of the fastening plate 270 of the base 210 shown in FIG. 2A. Similarly, the description of the detailed structure of the fastening plate 270 is exemplary. The present invention, however, is not limited thereto. One of ordinary skill in the art will know how to modify and change the structure within the scope of the present invention.

Figure 3A:
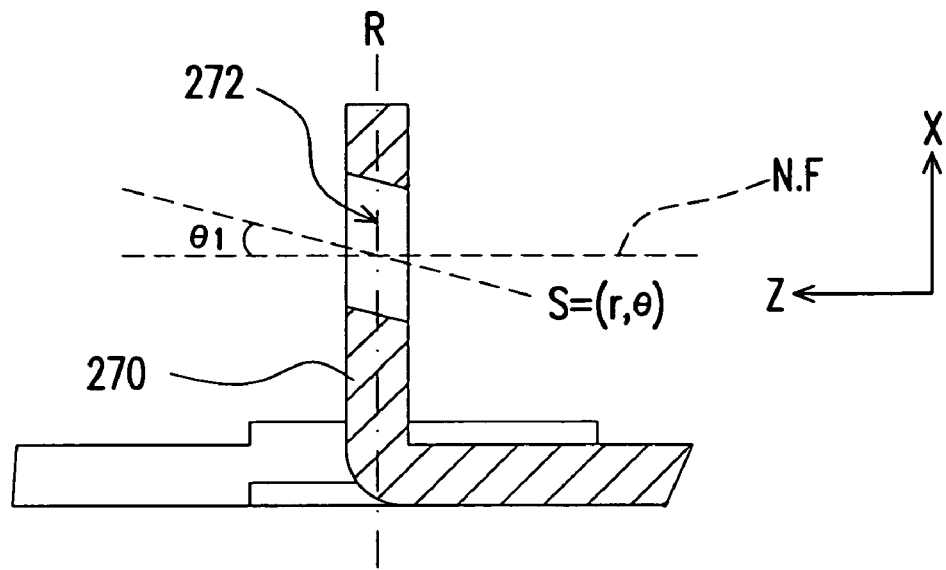
FIG. 3A is a sectional view of the fastening plate according to the first embodiment of the present invention.
Figure 3B:
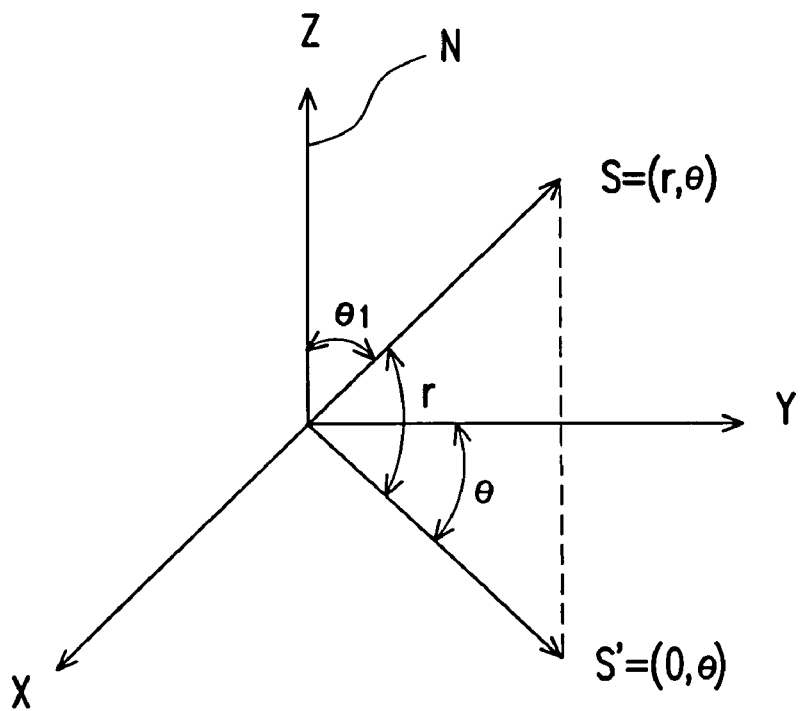
FIG. 3B is a schematic drawing showing an extension direction of a sliding opening according to the first embodiment of the present invention.

FIG. 3A is a sectional view of the fastening plate according to the first embodiment of the present invention. FIG. 3B is a schematic drawing showing an extension direction of a sliding opening according to the first embodiment of the present invention. Referring to FIGS. 3A and 3B, the fastening plate 270 is disposed on a reference plane R, and a normal vector N of the reference plane R is parallel to the track-seeking path F. The extension direction S of the sliding opening 272 and the normal vector N form an included angle θ1. Following is detailed description of the extension direction S of the sliding opening 272 and the included angle θ1.

Referring to FIG. 3B, if the reference plane to which the fastening plate 270 is disposed is the X-Y plane, the normal vector is N, i.e., Z axis, and the extension direction of the sliding opening 272 is S. S' represents the component of the extension direction S of the sliding opening 272 projected on the X-Y plane. Wherein, the included angle between the component S' and the Y axis is θ. The included angle θ1 is between 0 to 90 degrees, and the included angle θ can be any degree.

In this embodiment, the included angle θ between the component S' of the extension direction S of the sliding opening 272 projected on the X-Y plane and the Y axis can be, for example, 90 degree. It means that the extension direction S of the sliding opening 272 is upward as shown in FIG. 3A.

The extension direction S of the sliding opening 272, however, can be in any direction. It means that the included angle θ can be any degree. The description above merely is a preferred embodiment. The extension direction S of the sliding opening 272 is upward for easy assembly.

Figure 3C:
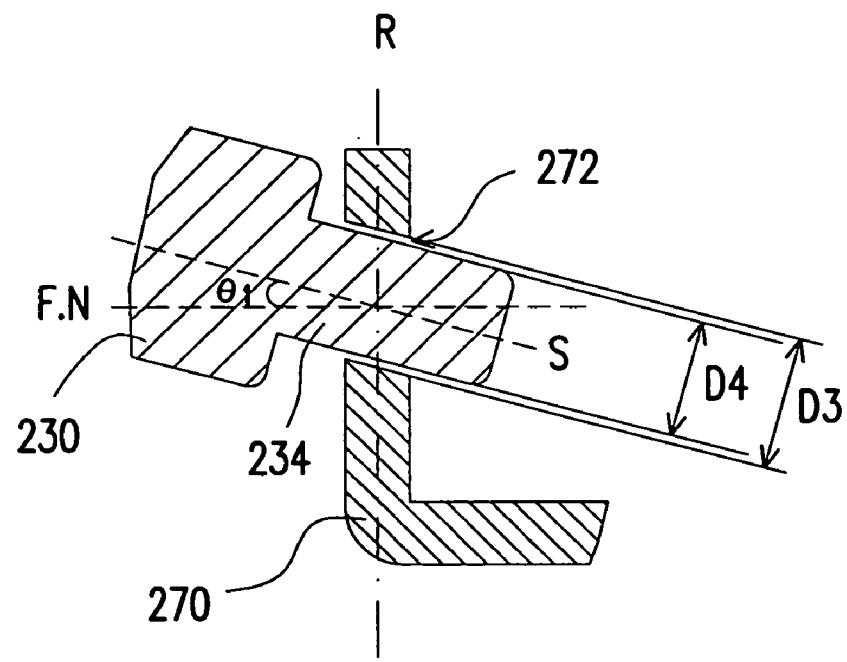
FIG. 3C is a local cross sectional view of a first shaft and the fastening plate of the first embodiment while being assembled according to the present invention.
Figure 3D:
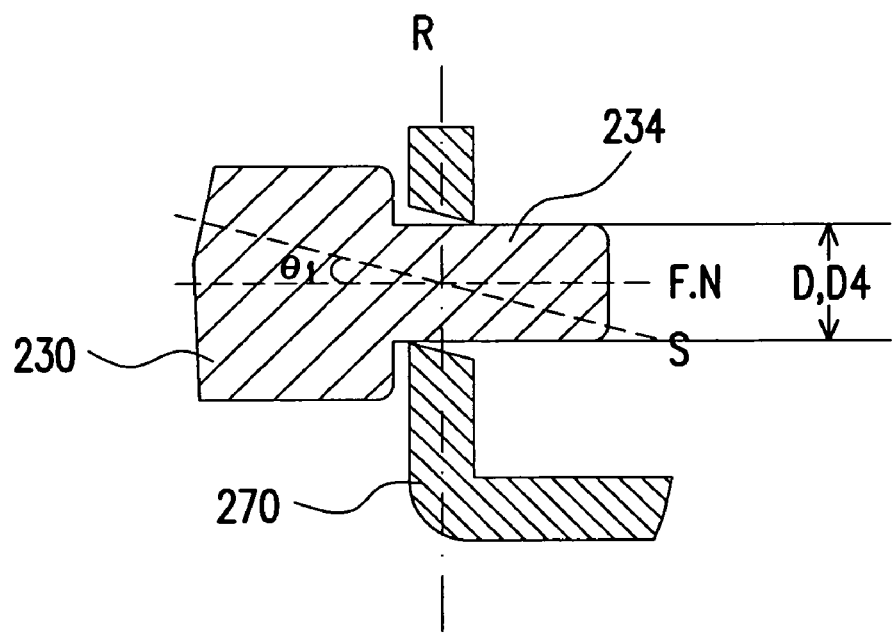
FIG. 3D is a local cross sectional view of a first shaft and the fastening plate of the first embodiment after assembled according to the first embodiment of the present invention.

FIG. 3C is a local cross sectional view of the first shaft and the fastening plate of the first embodiment while being assembled according to the present invention. FIG. 3D is a local cross sectional view of the first shaft and the fastening plate of the first embodiment after assembled according to the present invention. Referring to FIG. 3C, since the inner diameter D3 of the sliding opening 272 is larger than the outer diameter D4 of the first fastening part 234, the first fastening part 234 of the first shaft 230 can be smoothly inserted into the sliding opening 272 of the fastening plate 270 along the extension direction S of the fastening plate 270. In addition, the smallest inner diameter D, which is the projection of the sliding opening 272 on the reference plane R' is equal to the outer diameter D4 of the first fastening part 234. In other words, while the first shaft 230 is parallel to the track-seeking path F, the first shaft 230 is locked in the sliding opening 272.

Referring to FIG. 3D, after the first fastening part 234 of the first shaft 230 is successfully inserted into the sliding opening 272 of the fastening plate 270, the first shaft 230 is tilted with an angle, i.e., θ1, and one end of the first shaft 230, which does not slide into the sliding opening 272 is fastened in a fastening component 220 in FIG. 2A, so that another end of the first shaft 230 is disposed over the first fastening component 222. The axis direction of the first shaft 230 and the extension direction S of the sliding opening 272 form the included angle θ1, and the smallest inner diameter D, which is the projection of the sliding opening 272 on the reference plane R, is equal to the outer diameter D4 of the first fastening part 234. Accordingly, after assembly, the first shaft 230 tightly fits with the fastening plate 270. In other words, the first shaft 230, after assembly, will not create any vibrating noise between the first shaft 230 and the sliding opening 272 while the optical pickup head 260 is moving on the first shaft 230.

Figure 3E:
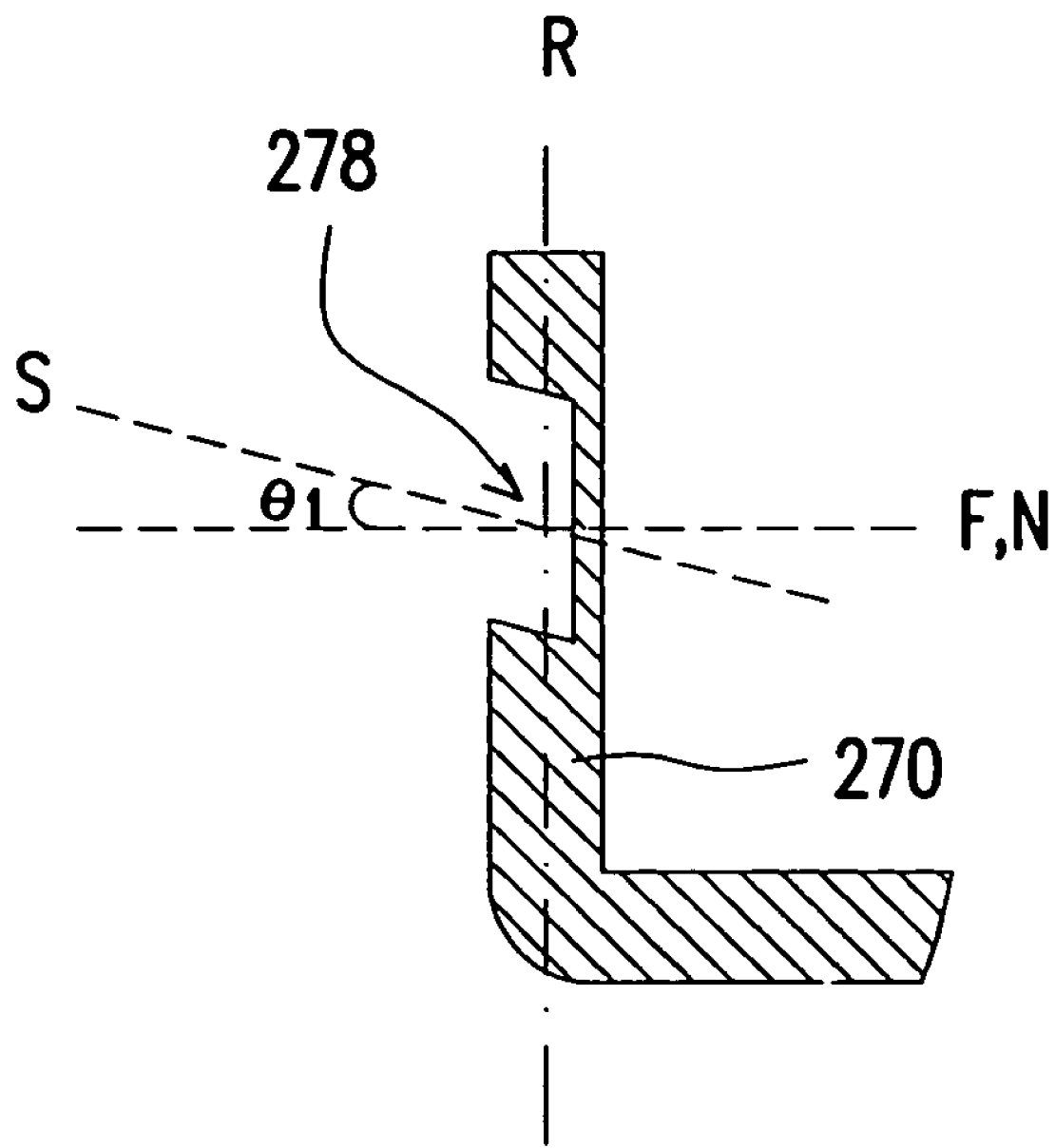
FIG. 3E is a local cross sectional view of a fastening plate with a recess of the first embodiment of the present invention.

FIG. 3E is a local cross sectional view of a fastening plate with a recess of the first embodiment of the present invention. Referring to FIGS. 3D and 3E, in addition to the fastening plate 270 with the sliding opening 272, a sliding recess 278 replaces the sliding opening 272 of the fastening plate 270 according to another embodiment of present invention. The sliding recess 278 has the design similar to the sliding opening 272. Referring to FIGS. 3D and 3E, the fastening plate 270 is disposed over a reference plane R, and the extension direction S of the sliding recess 278 and the normal vector N of the reference plane R or the track-seeking path F form an included angle θ1. Accordingly, the sliding recess 278, having the similar function as of the sliding opening 272, makes the first shaft 230 and the fastening plate 270 be tightly fitted after the assembly. Thus, noise generated from the vibration can be avoided.

The application of the sliding recess 278 replacing the sliding opening 272 is not limited to the first embodiment. This application can be used in the second to the fourth embodiments described below.

Accordingly, the fastening plate 270 is disposed on the reference plane R, and the normal vector N of the reference plane R is parallel to the track-seeking path F. Additionally, the fastening plate 270 comprises the sliding opening 272 or the sliding recess 278. The extension direction S of the sliding opening 272 or the sliding recess 278 and the track-seeking path F form the included angle θ1.

Second Embodiment

Figure 4A:
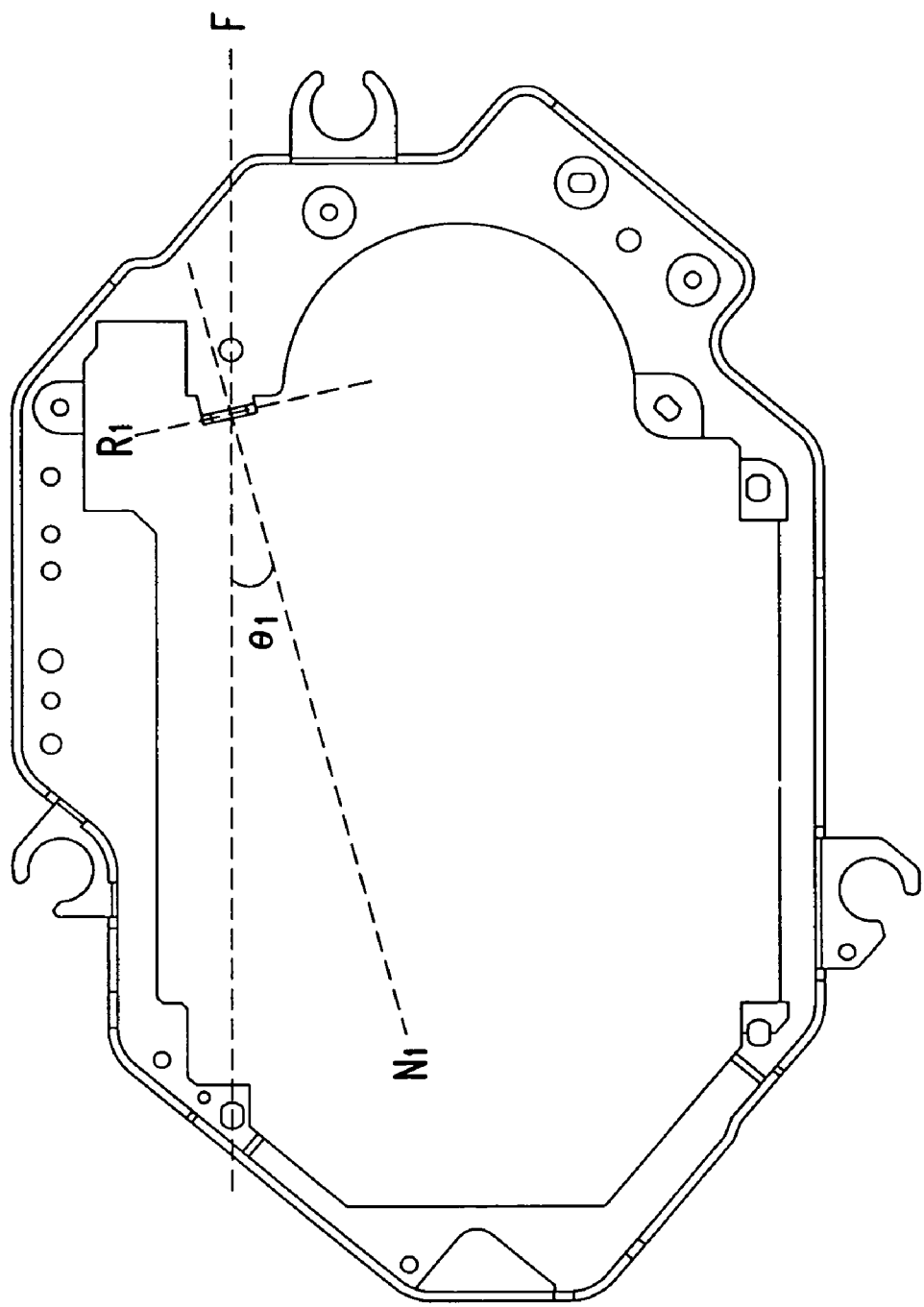
FIG. 4A is a top view showing a fastening plate with an included angle θ1 according to the second embodiment of the present invention.
Figure 4B:
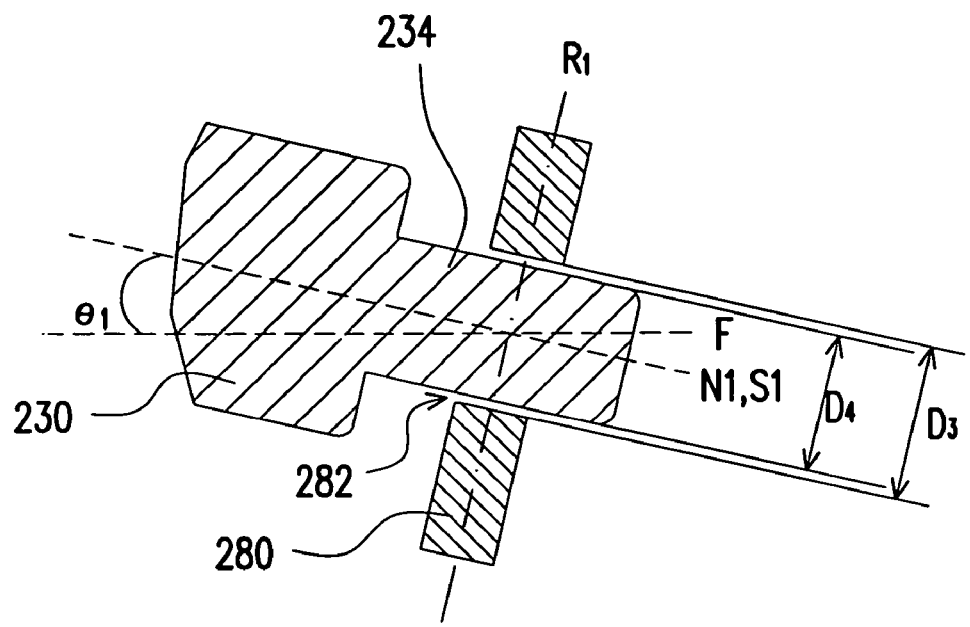
FIG. 4B is a cross sectional top view showing the fastening plate of the second embodiment and the first shaft while being assembled.

FIG. 4A is a top view showing a fastening plate with an included angle θ1 according to the second embodiment of the present invention. FIG. 4B is a cross sectional top view showing the fastening plate of the second embodiment in FIG. 4A and the first shaft while being assembled. Referring to FIGS. 4A and 4B, this embodiment is similar to the first embodiment. What is different is that the fastening plate 280 is disposed on a reference plane R1. The normal vector N1 of the reference plane R1 and the track-seeking path F form an included angle θ1, and the extension direction S1 of the sliding opening 282 is parallel to the normal vector N1 of the reference plane R1.

Referring to FIG. 4B, the normal vector N1 of the reference plane R1 and the track-seeking path F form the included angle θ1, i.e., the fastening plate 280 tilts with the included angle θ1 toward the left, the right, forward, or backward. The inner diameter D3 of the sliding opening 282 of the fastening plate 280 is larger than the outer diameter D4 of the first fastening part 234 of the first shaft 230. Accordingly, the first shaft 230 can be smoothly inserted into the sliding opening 282 of the fastening plate 280. In addition, the smallest inner diameter D, which is the projection of the sliding opening 272 on the reference plane R1 with the track-seeking path F as the normal vector, is equal to the outer diameter D4 of the first fastening part 234. In other words, when the first shaft 230 is parallel to the track-seeking path F, the first shaft 230 is locked in the sliding opening 272.

Figure 4C:
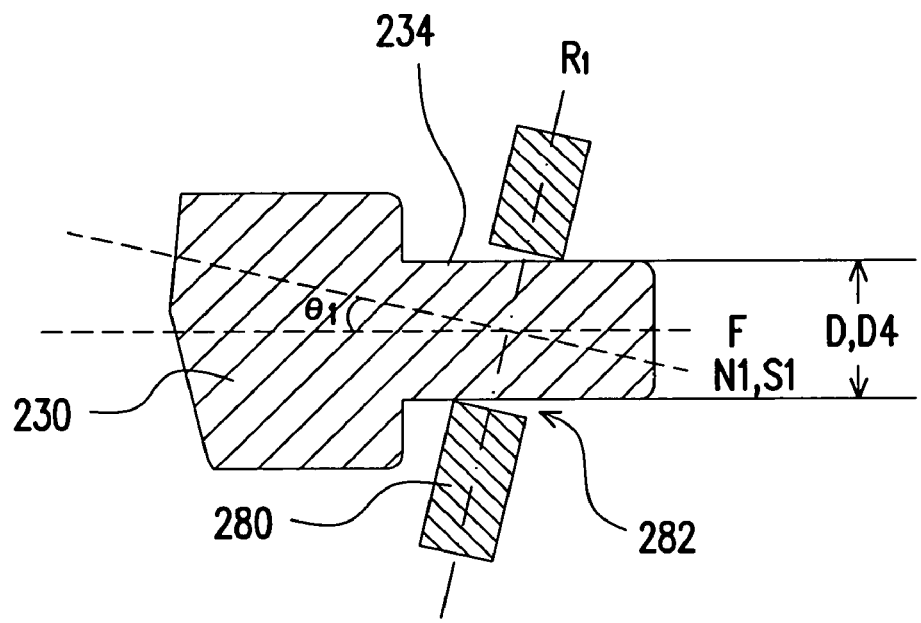
FIG. 4C is a cross sectional top view of the fastening plate of the second embodiment and a first shaft after assembly.

FIG. 4C is a cross sectional top view of the fastening plate of the second embodiment and a first shaft after assembly. Referring to FIG. 4C, after the first fastening part 234 of the first shaft 230 has been successfully inserted into the sliding opening 282 of the fastening plate 280, the first shaft 230 is tilted with an angle, i.e., θ1. In addition, one end of the first shaft 230, which does not slide into the sliding opening 282, is fastened in the fastening component 220 shown in FIG. 2A. Since the axis direction of the first shaft 230 and the extension direction S1 of the sliding opening 282 form the included angle θ1, and the smallest inner diameter D, which is the projection of the sliding opening 282 on the reference plane R1 with the track-seeking path F as the normal vector, is equal to the outer diameter D4 of the first fastening part 234, accordingly, the first shaft 230 will tightly fit with the fastening plate 280 after assembly. In other words, the first shaft 230, after assembly, will not generate any vibrating noise between the first shaft 230 and the sliding opening 282 while the optical pickup head 260 is moving on the first shaft 230.

Third Embodiment

Figure 5A:
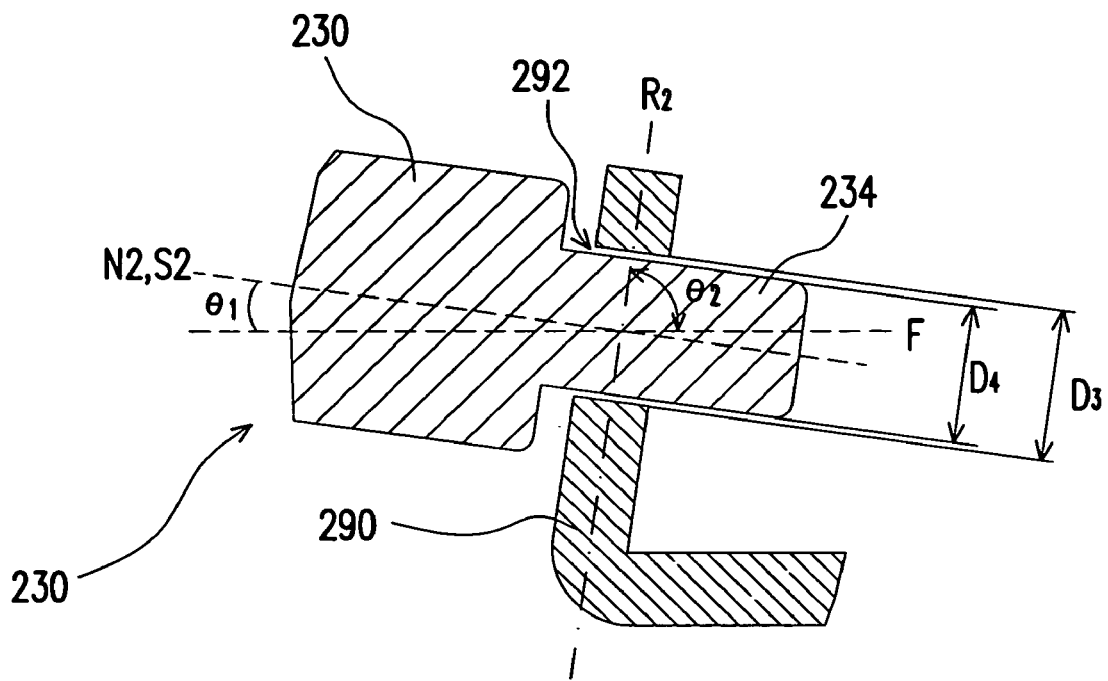
FIG. 5A is a vertical sectional view showing the fastening plate of the third embodiment and the first shaft while being assembled.

FIG. 5A is a vertical sectional view showing the fastening plate of the third embodiment and the first shaft while being assembled. Referring to FIG. 5A, the fastening plate 290 is disposed on a reference plane R2. The normal vector N2 of the reference plane R2 and the track-seeking path F form an included angle, i.e., θ1. The fastening plate 290 is tilted backward with the included angle θ1 as described in the second embodiment. The extension direction S2 of the sliding opening 292 is parallel to the normal vector N2 of the reference plane R2. The inner diameter D3 of the sliding opening 292 of the fastening plate 290 is larger than the outer diameter D4 of the first fastening part 234 of the first shaft 230. Accordingly, the first shaft 230 can be smoothly inserted into the sliding opening 292 of the fastening plate 290. In other words, the extension direction S2 of the sliding opening 292 of this embodiment is upward for easy assembly.

Figure 5B:
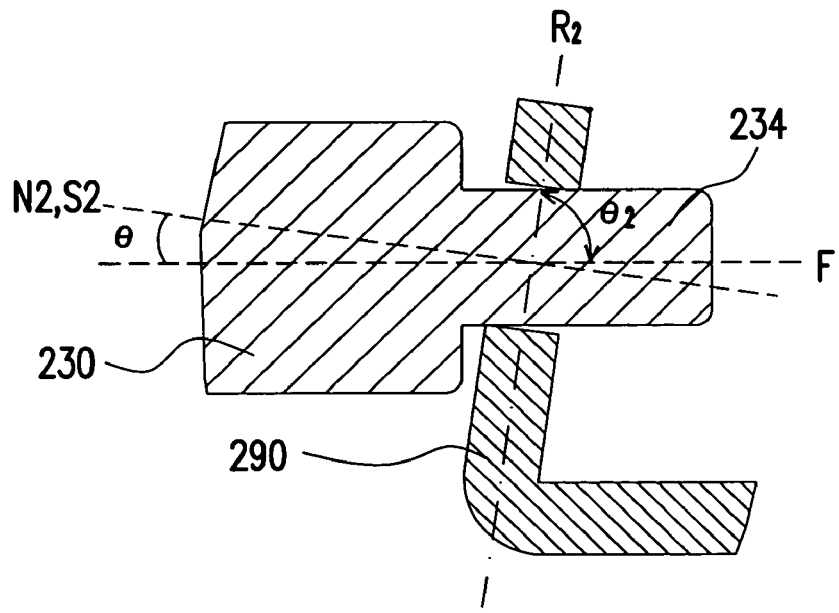
FIG. 5B is a vertical sectional view of the fastening plate of the third embodiment and a first shaft after assembly.

FIG. 5B is a vertical sectional view of the fastening plate of the third embodiment and a first shaft after assembly. Referring to FIG. 5B, after the first fastening part 234 of the first shaft 230 has been successfully inserted into the sliding opening 292 of the fastening plate 290, the first shaft 230 is tilted with an angle, i.e., θ1. One end of the first shaft 230, which does not slide in the sliding opening 292, is fastened in the fastening component 220 shown in FIG. 2A. The axis direction of the first shaft 230 and the extension direction S2 of the sliding opening 292 form the included angle θ1. Accordingly, after assembly, the first shaft 230 tightly fits with the fastening plate 290. In other words, the first shaft 230, after assembly, will not generate any vibrating noise between the first shaft 230 and the sliding opening 292 while the optical pickup head 260 is moving on the first shaft 230.

Fourth Embodiment

Figure 6A:
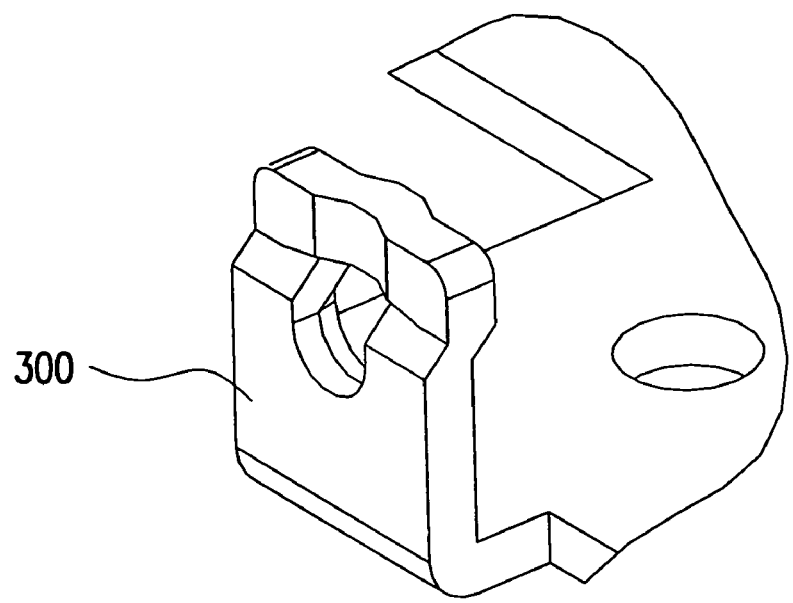
FIG. 6A is a schematic drawing showing a fastening plate according to the fourth embodiment of the present invention.
Figure 6A:
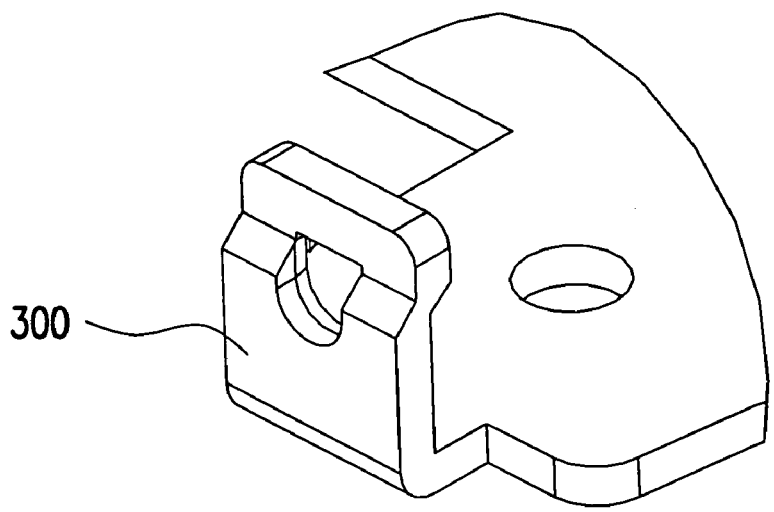
Figure 6B:
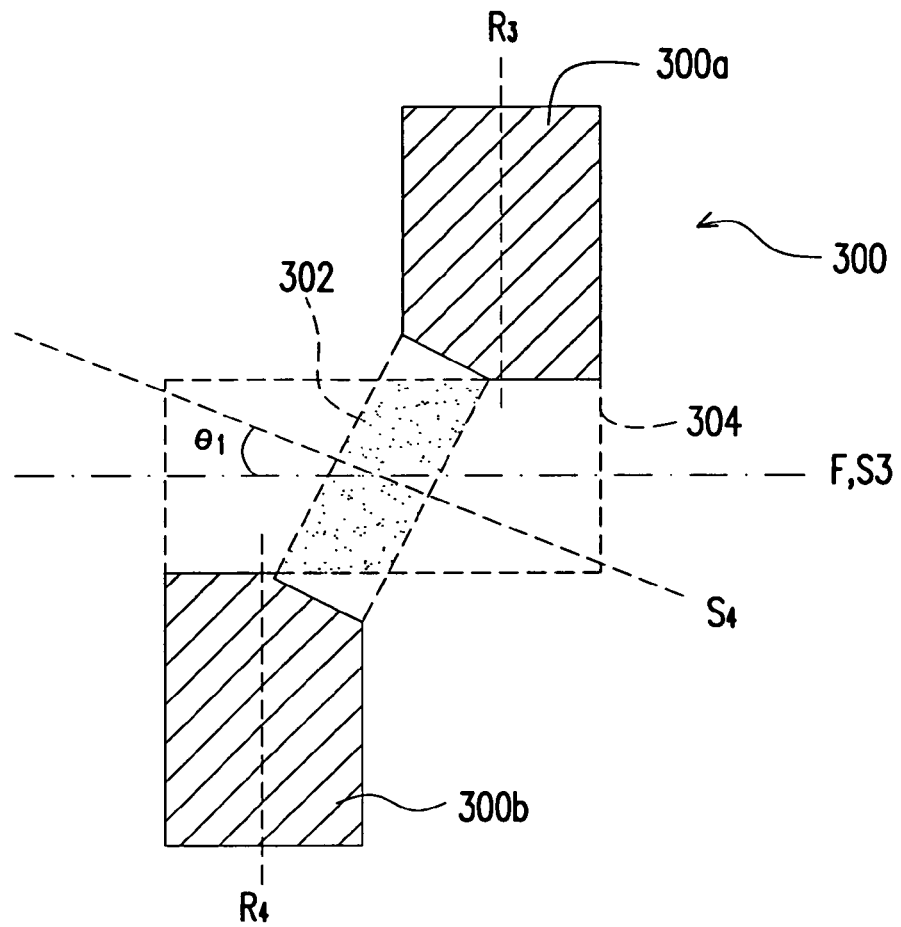
FIG. 6B is a vertical sectional view of a fastening plate according to the fourth embodiment of the present invention.

FIG. 6A is a schematic drawing showing a fastening plate according to the fourth embodiment of the present invention. FIG. 6A' is a schematic drawing showing another fastening plate according to the fourth embodiment of the present invention. FIG. 6B is a vertical sectional view of a fastening plate according to the fourth embodiment of the present invention. Referring to FIGS. 6A, 6A' and 6B, in order to more tightly fit the first shaft 230 (not shown) in the fastening plate 300, in addition to the sliding opening 302, the fastening plate 300 further comprises a support opening 304. The support opening 304 partially overlaps the sliding opening 302. Wherein, the extension direction S3 of the support opening 304 is parallel to the track-seeking path F. The extension direction S4 of the sliding opening 302 and the track-seeking path F form an included angle θ1.

Figure 6C:
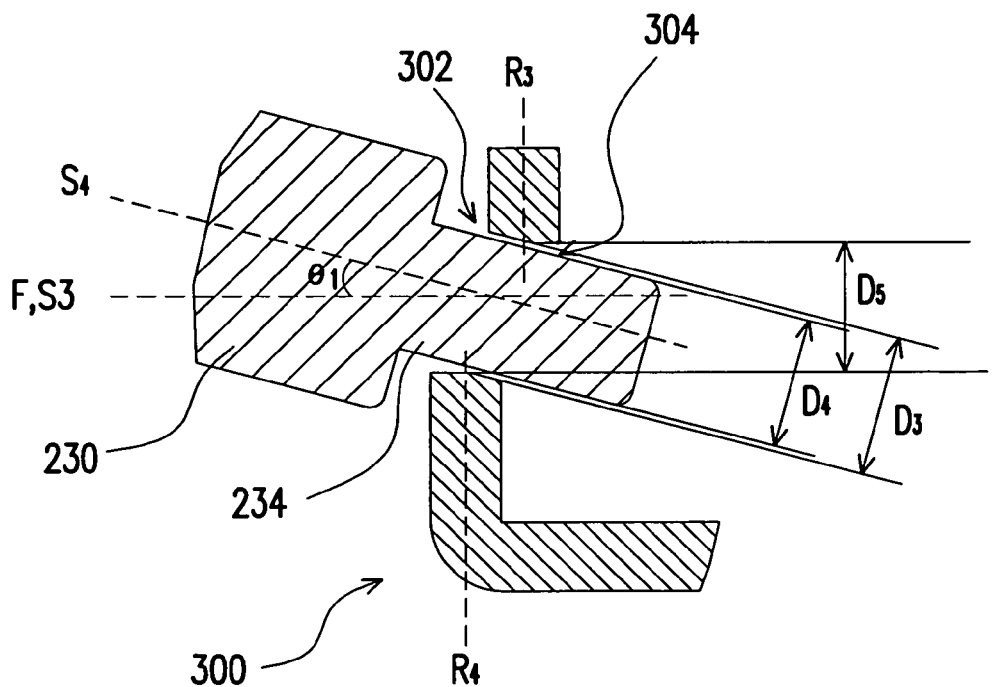
FIG. 6C is a vertical sectional view showing the fastening plate of the fourth embodiment arid the first shaft while being assembled.

FIG. 6C is a vertical sectional view showing the fastening plate of the fourth embodiment and the first shaft while being assembled. Referring to FIG. 6C, the first fastening part 234 of the first shaft 230 is smoothly inserted into the sliding opening 302 of the fastening plate 300 along the extension direction S4 of the sliding opening 302. Since the inner diameter D3 of the sliding opening 302 is larger than the outer diameter D4 of the first fastening part 234, the first shaft 230 can easily slide into the sliding opening 302 of the fastening plate 300.

Figure 6D:
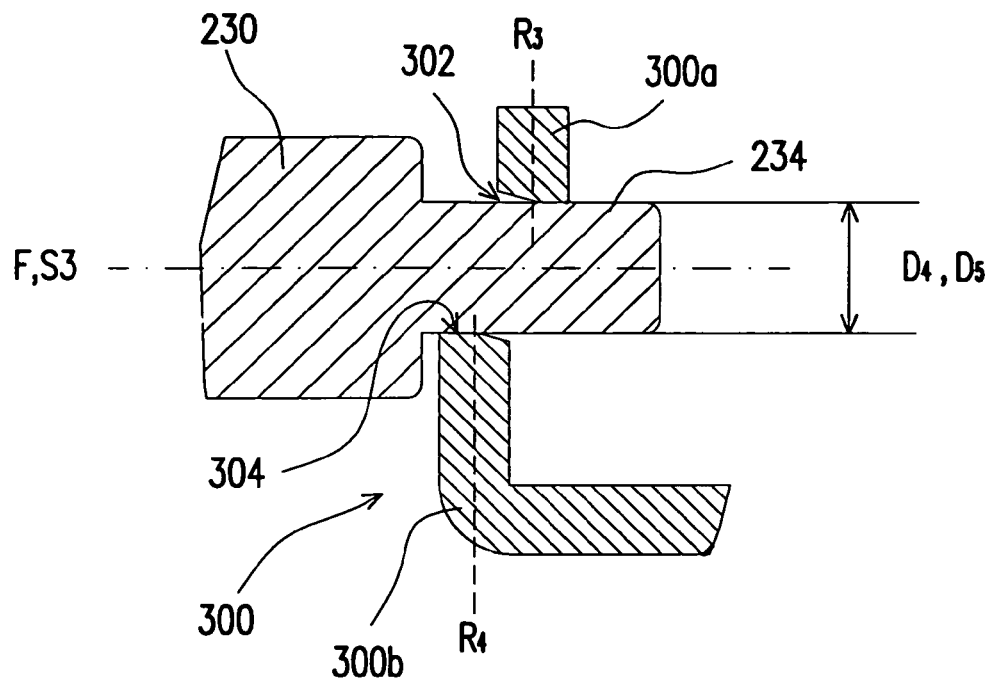
FIG. 6D is a vertical sectional view of the fastening plate of the fourth embodiment and a first shaft after assembly.

FIG. 6D is a vertical sectional view of the fastening plate of the fourth embodiment and a first shaft after assembly. Referring to FIGS. 6C and 6D, after the first fastening part 234 of the first shaft 230 has been successfully inserted into the sliding opening 302 of the fastening plate 300, the first shaft 230 is tilted with an angle, i.e., $\theta1$. One end of the first shaft 230, which does not slide in the sliding opening 302, is fastened in the fastening component 220 shown in FIG. 2A. Since the outer diameter D4 of the first fastening part 234 is substantially equal to the inner diameter D5 of the support opening 304 of the fastening plate 300, the first fastening part 234 of the first shaft 230 tightly fits in the support opening 304 of the fastening plate 300.

From FIG. 6D, the fastening plate 300 comprises, for example, the top part 300a and the bottom part 300b. Wherein, the top part 300a and the bottom part 300b define the sliding opening 302 and the support opening 304. The top part 300a and the bottom part 300b are not on the same plane. In more detail, the top part 300a and the bottom part 300b are on the reference planes R3 and R4, respectively. The reference plane R3 can be, or not, parallel to the reference plane R4, for example.

Figure 6E:
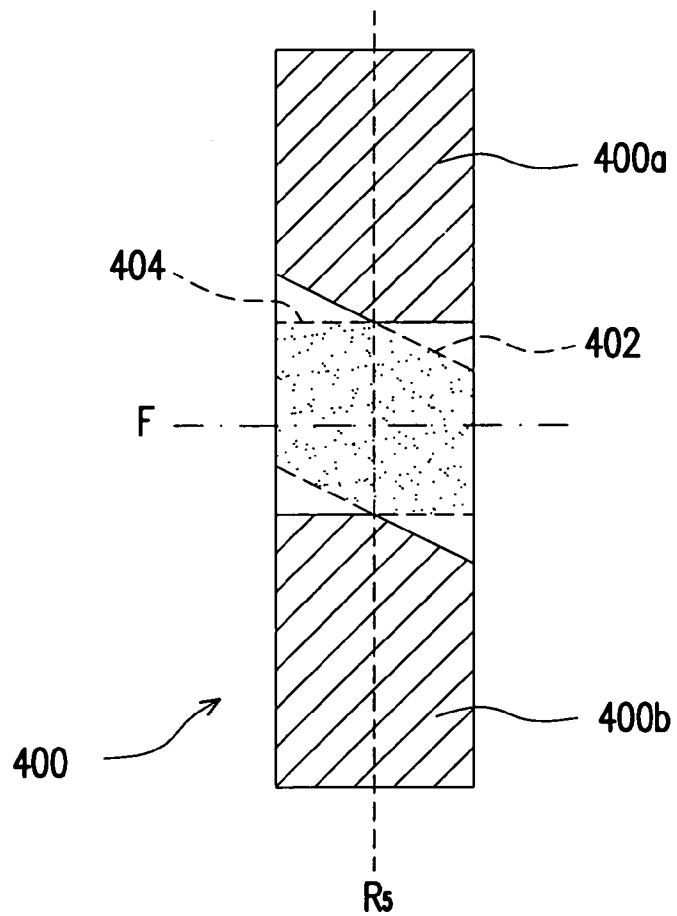
FIG. 6E is a vertical sectional view showing another fastening plate according to the fourth embodiment of the present invention.

FIG. 6E is a vertical sectional view showing another fastening plate according to the fourth embodiment of the present invention. Referring to FIG. 6E, the fastening plate of this embodiment is not limited to that shown in FIG. 6B; that the fastening plate 300 comprises the top part 300a and the bottom part 300b that are disposed on different reference planes R3 and R4. The fastening plate of this embodiment can be another type or design as shown in FIG. 6E. In detail, the fastening plate 400 comprises the sliding opening 402 and the support opening 404. The support opening 404 partially overlaps the sliding opening 402. In another aspect, the top part 400a and the bottom part 400b of the fastening plate 400 can be on the same reference R5, for example. In this embodiment, not only can the fastening plates 300 and 400 be quickly assembled with the shafts, but also be tightly fitted with each other.

Accordingly, the optical pickup module of the present invention comprises at least the following advantages:

1. In the present invention, the extension direction of the sliding opening and the track-seeking path form an included angle. Not only can one end of the shaft be smoothly inserted into the sliding opening or the sliding recess of the fastening plate along the axis of the sliding opening or the sliding recess, but also the shaft is tightly fitted in the sliding opening or the sliding recess to avoid the noise resulting from vibration.

2. The process of fabricating the fastening plate of the present invention is compatible with the traditional process. Thus, the cost will not be increased.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. An optical pickup module for reading data stored in a disc along a track-seeking path, comprising:
    a base having a fastening plate, wherein the fastening plate comprises a sliding opening, and an extension direction of the sliding opening and the track-seeking path form an included angle, the fastening plate is disposed on a reference plane, a normal vector of the reference plane and the track-seeking path form the included angle;
    a first fastening component disposed over the base;
    a first shaft, wherein an end of the first shaft is inserted in the sliding opening, another end of the first shaft connects with the first fastening component, and the first shaft is parallel to the track-seeking path; and
    an optical pickup head movably disposed on the first shaft so that the optical pickup head moves back and forth along the track-seeking path.

2. The optical pickup module of claim 1, wherein an inner diameter of the sliding opening is larger than an outer diameter of the end of the first shaft inserted in the sliding opening.

3. The optical pickup module of claim 1, wherein the first shaft is wedged in the sliding opening when the first shaft is parallel to the track-seeking path.

4. The optical pickup module of claim 1, wherein the base comprises a sheet metal part.

5. The optical pickup module of claim 1, wherein the first fastening component comprises:
    a first fastening socket comprising a first shaft slot and a first lock hole, wherein the first shaft is disposed in the first shaft slot;
    a first elastic component disposed in the first shaft slot to support the first shaft; and
    a first lock component disposed in the first lock hole to fasten the first shaft in the first shaft slot.

6. The optical pickup module of claim 1, wherein the first shaft comprises:
    a first rod; and
    two first fastening parts, connecting with two ends of the first rod, wherein the first fastening parts are fastened to the fastening plate and the first fastening component.

7. The optical pickup module of claim 1, further comprising:
    two second fastening components disposed on the base; and
    a second shaft, wherein two ends of the second shaft connects with the second fastening components, and the second shaft is parallel to the track-seeking path.

8. The optical pickup module of claim 7, wherein each of the second fastening components comprises:
    a second fastening socket, comprising a second shaft slot and a second lock hole, wherein the second shaft is disposed in the second shaft slot;
    a second elastic component, disposed in the second shaft slot to support the second shaft; and
    a second lock component, disposed in the second lock hole to fasten the second shaft in the second shaft slot.

9. The optical pickup module of claim 7, wherein the second shaft comprises:
    a second rod; and
    two second fastening parts, connecting with two ends of the second rod, wherein the second fastening parts are fastened by the second fastening components.

10. The optical pickup module of claim 1, wherein the fastening plate further comprises a support opening, the support opening partially overlaps the sliding opening, and an extension direction of the support opening is parallel to the track-seeking path.

11. An optical pickup module, adapted to read data stored in a disc along a track-seeking path, the optical pickup module comprising:
    a base having a fastening plate, wherein the fastening plate comprises a sliding recess, and an extension direction of the sliding recess and the track-seeking path form an included angle, the fastening plate is disposed on a reference plane, a normal vector of the reference plane and the track-seeking path form the included angle;
    a first fastening component disposed over the base;

a first shaft, an end of the first shaft being inserted in the sliding recess, another end of the first shaft connecting with the first fastening component, the first shaft being parallel to the track-seeking path; and an optical pickup, movably disposed on the first shaft so that the optical pickup moves back and forth along the track-seeking path.

12. The optical pickup module of claim 11, wherein an inner diameter of the sliding recess is larger than an outer diameter of the end of the first shaft which is inserted in the sliding recess.

13. The optical pickup module of claim 11, wherein the first shaft is wedged in the sliding recess when the first shaft is parallel to the track-seeking path.

14. The optical pickup module of claim 11, wherein the base comprises a sheet metal part.

15. The optical pickup module of claim 11, wherein the first fastening component comprises:
   a first fastening socket, comprising a first shaft slot and a first lock hole, wherein the first shaft is disposed in the first shaft slot;
   a first elastic component, disposed in the first shaft slot to support the first shaft; and
   a first lock component, disposed in the first lock hole to fasten the first shaft in the first shaft slot.

16. The optical pickup module of claim 11, wherein the first shaft comprises:
   a first rod; and
   two first fastening parts, connecting with two ends of the first rod, wherein the first fastening parts are fastened to the fastening plate and the first fastening component.

17. The optical pickup module of claim 11, further comprising:
   two second fastening components, disposed on the base; and
   a second shaft, wherein two ends of the second shaft connect with the second fastening components, and the second shaft is parallel to the track-seeking path.

18. The optical pickup module of claim 17, wherein each of the second fastening components comprises:
   a second fastening socket, comprising a second shaft slot and a second lock hole, wherein the second shaft is disposed in the second shaft slot;
   a second elastic component, disposed in the second shaft slot to support the second shaft; and
   a second lock component, disposed in the second lock hole to fasten the second shaft in the second shaft slot.

19. The optical pickup module of claim 17, wherein the second shaft comprises:
   a second rod; and
   two second fastening parts, connecting with two ends of the second rod, wherein the second fastening parts are fastened by the second fastening components.

* * * * *